United States Patent
Hugghins et al.

(10) Patent No.: US 8,435,471 B2
(45) Date of Patent: May 7, 2013

(54) METHOD FOR WET FLUE GAS DESULFURIZATION

(75) Inventors: Barry Hugghins, Port Allen, LA (US); Joseph Daniel Cook, Athens, AL (US)

(73) Assignee: 2R Environmental Systems, LLC, Port Allen, LA (US)

( * ) Notice: Subject to any disclaimer, the term of this patent is extended or adjusted under 35 U.S.C. 154(b) by 0 days.

(21) Appl. No.: 13/390,710

(22) PCT Filed: Oct. 22, 2009

(86) PCT No.: PCT/US2009/061674
§ 371 (c)(1),
(2), (4) Date: Feb. 16, 2012

(87) PCT Pub. No.: WO2011/031277
PCT Pub. Date: Mar. 17, 2011

(65) Prior Publication Data
US 2012/0148467 A1    Jun. 14, 2012

Related U.S. Application Data

(60) Provisional application No. 61/276,586, filed on Sep. 14, 2009.

(51) Int. Cl.
*B01D 53/50* (2006.01)

(52) U.S. Cl.
USPC .................................. 423/242.4; 423/243.08

(58) Field of Classification Search ............... 423/242.4, 423/243.08
See application file for complete search history.

(56) References Cited

U.S. PATENT DOCUMENTS

| | | | | |
|---|---|---|---|---|
| 4,891,195 A | * | 1/1990 | Lin | 423/242.3 |
| 5,520,897 A | * | 5/1996 | Rogers et al. | 423/242.1 |
| 5,759,505 A | * | 6/1998 | Nolin et al. | 423/243.08 |

OTHER PUBLICATIONS

International Preliminary Report on Patentability received in PCT Application No. PCT/US09/61674, Dec. 2011.

* cited by examiner

*Primary Examiner* — Timothy Vanoy
(74) *Attorney, Agent, or Firm* — The Law Office of Michael E. Kondoudis

(57) ABSTRACT

A wet flue gas desulfurization process uses byproduct polyester streams such as those from the production of PLA and/or PGA consisting of hydroxy acids and other organic acids to catalyse the solubilization of calcium from limestone and to further catalyse the reaction of calcium with $SO_2$ for desulfurization and thereby provide significant improvement in process efficiency.

16 Claims, 1 Drawing Sheet

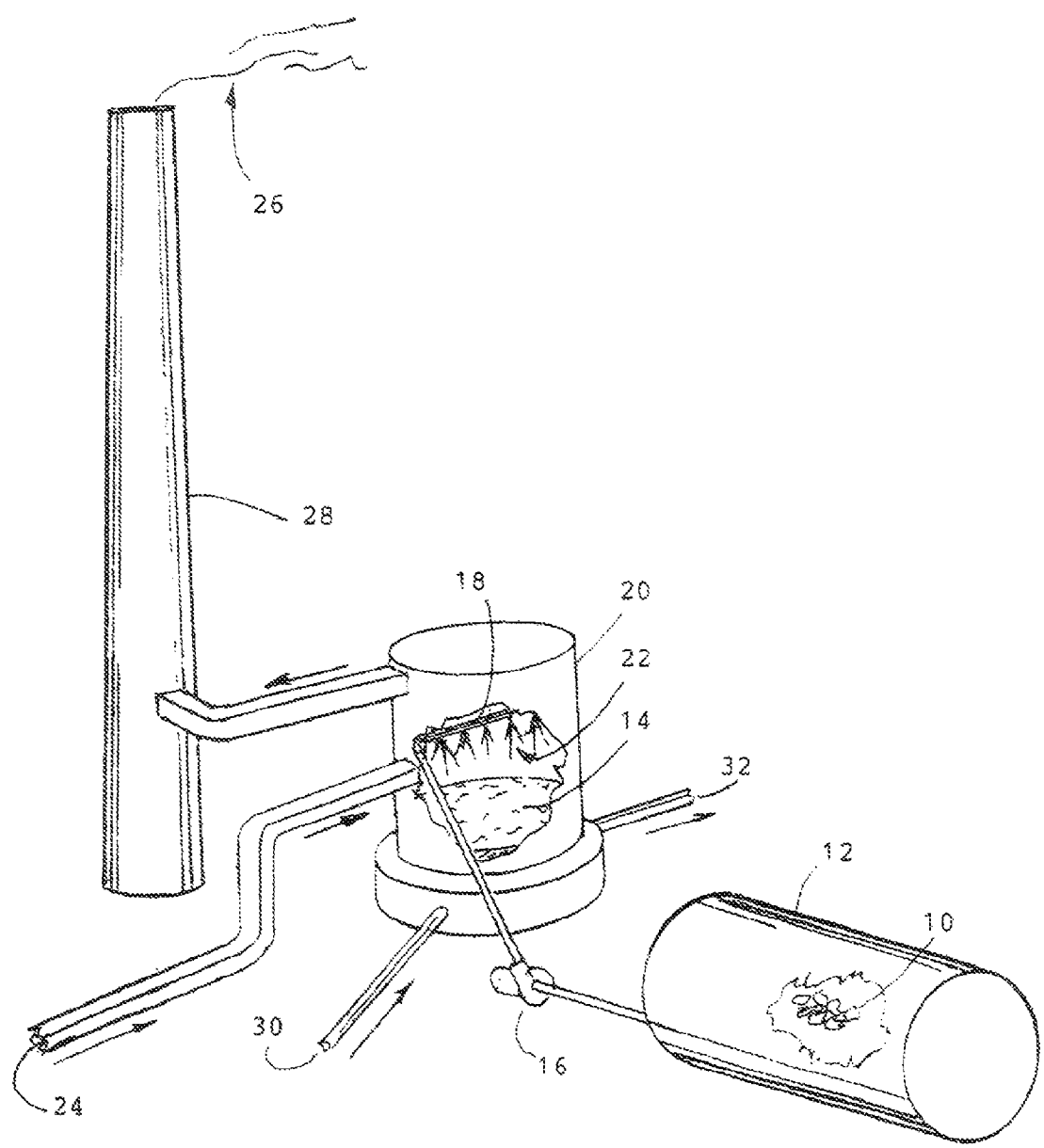

METHOD FOR WET FLUE GAS DESULFURIZATION

CROSS-REFERENCE TO RELATED APPLICATIONS

This application relates to, and claims the benefit of the filing date of, co-pending U.S. provisional patent application Ser. No. 61/276,586 entitled METHOD FOR WET FLUE GAS DESULFURIZATION, filed Sep. 14, 2009, the entire contents of which are incorporated herein by reference for all purposes.

TECHNICAL FIELD

The present invention relates generally to the field of flue gas desulfurization processes and most particularly, to the use of industrial byproduct stream as catalysts therein.

BACKGROUND OF THE INVENTION

Emission of sulfurous flue gasses from industrial activities utilizing coal fired boilers and other processes are a worldwide ecological problem. $SO_2$ emissions from the flue gas of coal-fired power plants and the like have made the United States a major contributor in this regard.

A process, wherein the $SO_2$ is selectively reacted with a finely divided limestone slurry, is well known as wet flue gas desulfurization or WFGD. In this process, limestone is pulverized in a ball mill to provide the surface area needed to achieve the desired reaction kinetics. This limestone is mixed with water to produce a pumpable slurry and then utilized in a counter current reactor, or "absorber", to come into intimate contact with the flue gas being treated. Ball mill operations are power intensive, so the degree of particle size reduction must be optimized by balancing the milling costs against the efficiency improvement of the scrubbing process.

In many prior art embodiments of the WFGD process, dibasic acids (DBA) are added in the absorber stage as a catalyst and pH buffer to chemically enhance the reaction kinetics and thus the efficiency of the desulfurization process. DBA, which is both a DuPont product and a DuPont tradename, is commonly found as a byproduct stream made up of Glutaric, Succinic, Adipic and Nitric acids, coming from the production of adipic acid as a precursor to Nylon™. Monsanto produces a similar byproduct stream, having the trade name of AGS (also called DBA, colloquially, by users in the market place). Each of these byproduct stream components, except for the nitric acid, has very limited water solubility, so that the typical mixture used by the utilities must be shipped and stored as a 50% water solution at about 160 degrees F. in order to stay in solution.

In the absorber, $SO_2$ in the flue gas reacts with the limestone ($Ca\ CO_3$) slurry so as to remove the $SO_2$ by converting it to $Ca\ SO_4$ (gypsum). $CO_2$ is produced as a by-product of this reaction, and exits the absorber with the rest of the now de-sulfurized flue gasses. As is well known to those skilled in the art, DBA acts to catalyze the reaction of $SO_2$ in the flue gas with the calcium carbonate in the aqueous phase of the absorber slurry.

Calcium carbonate has a very low solubility in water, which is problematic since the reaction between it and the $SO_2$ must take place in the aqueous phase of the absorber. This problem is overcome when the calcium carbonate comes into contact with the DBA, because it reacts with the DBA to produce calcium salts with enhanced water solubility, specifically calcium adipate, calcium succinate and calcium glutarate. As stated above, since the $SO_2$ can only react with the calcium in the aqueous phase of the absorber, the higher the concentration of water soluble calcium salts in the absorber slurry, the greater the number of calcium ions that come into contact with the $SO_2$, the more efficiently the $SO_2$ is removed and the resulting gypsum is formed.

Since the DBA acts only as a catalyst in this process, it is unchanged and reverts to its acid form as the reaction is completed and the gypsum is formed, remaining in the water solution, available to react with other calcium carbonate molecules. As the residual slurry is de-watered, the water containing the now reformed DBA and/or any newly formed calcium salts is then returned to the absorber for reuse. The de-watered gypsum may then be used for making wallboard or for other purposes, or simply land filled.

It has been shown that without the intermediate formation of salts resulting from the reaction of calcium carbonate with the DBA catalyst, the transfer of the conversion of $SO_2$ and calcium carbonate to $Ca\ SO_4$ (gypsum) is difficult, time consuming and inefficient. Even so, there are significant cost and maintenance issues with DBA, because:

a.) Even though the DBA reaction with calcium carbonate produces calcium salts whose solubility is greater than either calcium carbonate or DBA alone, these calcium salts still have somewhat limited water solubility; and b.) Under the conditions present in the absorber system, the DBA experiences rapid degradation and therefore significant volumes of new DBA catalyst solution must continuously be added to maintain sufficient concentrations in the absorber liquid to promote the removal of $SO_2$; and c.) The corrosive nature of DBA can promote erosion and/or corrosion in the absorber over the long term so as to become a maintenance issue. Because of its corrosive nature, DBA is considered to be a hazardous material, with safe transportation, handling and environmental issues, all of which add to the total process costs.

The Environmental Protection Agency has imposed ever-tighter regulations on sulphurous emissions and may be expected to continue to do so in the future, so that process efficiency and overall cost will become increasingly more important. In any case, process cost will be a continuing concern.

It would seem logical to add DBA to the limestone at the grinding stage, so as to reduce ball mill frictional losses and begin the conversion of calcium carbonate to calcium salts earlier in the process. This is not feasible however, since DBA quickly breaks down in the ball mill and becomes ineffective as a catalyst.

A first object of the present invention is, therefore to reduce WFGD process and maintenance costs. A second object is to eliminate or mitigate safety and environmental issues involved in the process. Yet a third object is to enhance the efficiency of the desulfurization process.

SUMMARY OF THE INVENTION

In a preferred embodiment of the present invention, the above objects are accomplished by substituting for the DBA stream of prior art, a stream of mixed, crude polymers, derived from natural renewal resources, including, but not limited to, those polymer streams composed of various polyesters derived from hydroxy acids, the monomers from which the polyesters are produced and which result from the polyester's de-polymerization, and other organic acids that are co-produced in the polymer production process.

Such streams are readily available as a byproduct of polyester plastic production from renewable resources such as corn syrup, specifically Polylactate (PLA) or Polyglycolate (PGA) production, which comprise mixtures of alpha hydroxy acids; i.e. the inherently enantiopure (either D or L) lactic acid monomers and polymers of the PLA byproduct or the non-chiral glycolic acid monomers and polymers of the PGA byproduct.

In the present invention, such byproduct polyester streams may do not degrade as does DBA and are especially effective in achieving the aforesaid objects when added to the limestone in the ball mill stage of the desulfurization process. Here, there is an added synergistic effect to be realized when the slurry is activated by solubilizing calcium through the addition of such hydroxy acid mixtures that further include other organic acids, preferably poly hydroxy organic acids. The present invention serves the aforesaid objectives in that:

a.) DBA is corrosive in nature and therefore classified as "hazardous material". In contrast to this, the byproduct polyester streams of this embodiment are environmentally friendly, inasmuch as they are now made from the fermentation of sugars and starches, all renewable resources. They are thus safe for transportation, handling and disposal.

b.) DBA in its anhydrous form is a solid, and thus must be diluted to a 50/50 mixture in water to facilitate handling and storage. It must then be held at a temperature of about 160 F during transportation and storage in order for it to remain in solution in the water. Without dilution and without maintaining the DBA at elevated temperatures, its storage and handling becomes so problematic as to be impractical. The byproduct polyester streams of the present invention tend to be produced as solids in the form of hard nodules or lumps or as extremely viscous liquids, and thus must also be diluted with water, at least to some degree, to reduce their viscosity and increase their pumpability. Once diluted, they may be easily shipped and stored at temperatures down to 60 F.

c.) Compared to DBA, the byproduct polyester streams of the present invention are significantly more stable in the absorber system environment. DBA in such an environment degrades at a rate three times faster than do the polyesters, precursors, and co-products contained in the byproduct polyester streams of the present invention. As a result, the high replenishment rates of DBA are not required d.) In contrast to DBA, the byproduct polyester streams of this embodiment are a combination of polymers and monomers of hydroxy acids and other organic acids such as polyhydroxy organic acids, and thus provide significant catalytic synergies for solubilizing calcium in the aqueous phase of the absorber system, making increased concentrations of calcium ions available for reacting with $SO_2$ in the desulfurizing process as compared to those calcium ion concentrations generated by the reaction of calcium carbonate with DBA.

e.) Adding the byproduct polyester streams of this invention at the ball mill will result in the immediate formation of water soluble salts and a corresponding increase in the calcium ion concentration of the aqueous phase of the absorber slurry without the necessity of reducing the calcium carbonate to such a fine mesh. Because this can be done without the danger of degradation as would be the case with DBA, the use of these byproduct polyester streams allows using limestone of a coarser mesh, so as to reduce milling time, power consumption, ball mill wear, and maintenance expenses.

f.) The cost of the byproduct polyester streams of the present invention, because they are produced from natural renewal resources, and derived as byproducts from the production of polyester plastics such as PLA or PGA, is significantly less than that of DBA.

BRIEF DESCRIPTION OF THE DRAWING

FIG. 1 is a perspective view of an embodiment of a wet flue gas desulfurization process in accordance with an aspect of the present invention.

DETAILED DESCRIPTION OF THE INVENTION

Polyesters can be composed of polymers of hydroxy acids. PLA and PGA are the polymers of the simplest alpha hydroxy acids: lactic acid and glycolic acid, respectively. PLA is a polymer composed of repeating units of lactic acid; PGA is a polymer composed of repeating units of glycolic acid. It is known to those skilled in the art that these polyesters in their commercial plastic form will not catalyze the removal of $SO_2$ by conversion of calcium carbonate into gypsum. It is also well known to those skilled in the art that an aqueous solution of these polyesters exhibit sufficient stability that they will not revert back to their hydroxy acid monomers for such a purpose simply because they have been dissolved in water. If these polyesters, such as the PLAs and PGAs, reverted simply by being placed in the presence of water, they would not serve their commercial purposes as plastics.

The use of byproduct polyester streams from the production of PLAs or PGAs as flue gas desulfurization catalysts is unobvious in that if, for instance, a liquid solution of PLAs were to be added to the absorber system by itself, little if any reversion would take place. It is only when catalyzed by presence of other organic acid "contaminants" in the streams that such reversion takes place at a sufficiently rapid rate. The organic acid contaminants which are typically contained at levels sufficient to catalyze the desired reversion of the byproduct polyester streams of this embodiment include, but are not limited to the following: Valeric, Propionic, Formic, Acetic, Succinic, Butryic, Glycolic, 2 Hydroxybutyric, Alpha Hydroxyglutaric, and Gluconic acids; also Fatty acids, Amino acids, Nucleic acids and sugars, such as Maltose, Dextrose, Sucrose, Glucose, Fructose and the like which also act as mild acids. These organic acid contaminants are present in sufficient quantites that the PLAs, which are linear aliphatic ester, will revert back into their hydroxy acid monomers, under the conditions found in the ball mill and/or the absorber system, through the process of hydrolysis.

Just as PLA+an appropriate amount of water+an appropriate catalyst reverts to monomeric units of lactic acid, so PGA+an appropriate amount of water+an appropriate catalyst reverts to monomeric units of glycolic acid. When catalyzed by the organic acids according to the present inventions both PLA and PGA break down equally well, so that lactic acid and glycolic serve equally well as a WFGD catalyst, as would other water soluble hydroxy acids.

A comparison of the catalytic efficiency of the byproduct polyester streams of the present invention to that of DBA follows: The average molecular weight of DBA is ~134. It has two functionalities, so its combining weight is ~67. Lactic acid, one of the most common hydroxy acid, for comparison, has a molecular weight of 90. Even though the second hydroxyl group has some acidic properties, it must be considered to have only one functionality, so its' combining weight is ~90. Thus, on the surface, it would appear that ~30% more of this common hydroxy acid would be required than DBA. However polyesters such as PLA are more effective than DBA, because:

a.) They are being added in the form of polyesters which have the combining weight of only 72 per functionality, thus the hydroxy acid is being added in a "compressed form" that will hydrate to the reactive form once in the system, relatively the same as DBA.

b.) The hydroxy acids which they revert to are more stable than the DBA in the absorber system, with less being consumed in the process and thus will last far longer and will need the addition of less "make-up" acid.

c.) While the present inventions are applicable to use with other alkaline solids, such as sodium carbonate, potassium carbonate, calcium carbonate and magnesium carbonate for wet flue gas desulfurization, the reagent chosen for cost and availability in the preferred embodiment of the invention is calcium carbonate. In this embodiment, the hydroxy acids will act synergistically with other organic acids present to form metastable calcium complexes of calcium ions in solution, causing more calcium to be solubilized than a corresponding amount of DBA.

d.) There is also a synergistic effect to be realized from mixtures of polyhydroxy acids with hydroxy acids in that the mixtures will solubilize more calcium than will the individual acids alone. They bring the pH down more effectively as a mixture, since each acid component of the mixture has its own pKa, and because the organic acid mixtures will form metastable complexes with calcium ions in solutions rather than forming simple calcium salts. For example the solubility of calcium lactate is 66 g/L; the solubility of calcium gluconate is 35 g/L; the solubility of a mixture of calcium lactate and calcium gluconate is 400 g/L. As a result, the catalyst of the present invention has a capacity to solubilize more calcium than would the individual acids acting alone and significantly more than does DBA.

The importance of this is that the calcium carbonate in the absorber slurry is a mixture of a suspension of calcium carbonate and a solution of the calcium salts of the absorber catalyst. It is the calcium salts of the absorber catalyst that are available to react with the $SO_2$ because the reaction takes place in the water phase and thus the calcium has to be solubilized to react. When attempting to solubilize calcium, there is a synergistic effect between poly hydroxy organic acids, such as gluconic acid and its homologues, and mono hydroxy organic acids, such as lactic or glycolic, such that an amount of calcium greater by an order of magnitude, or more, can be put into solution by employing the mixture of acids than can be solubilized by using either acid alone.

The monomers and polymers of hydroxy acids, and mixtures thereof, catalyze a reaction of flue gas sulfurs and solubilized alkalines to remove sulfur from the flue gasses. Since the calcium in a WFGD system must first become soluble before it can react with the sulfur in the flue gas, solubilizing and thus activating the calcium, is key to the scrubber catalyst function. Obviously, the more calcium that can be activated, the more efficiently the scrubber works. If a mixture of organic acids and hydroxy acids, that has the property of being able to activate more calcium ions than the individual component acids would do, is used as a catalyst, then the efficiency of the absorber will be increased because there is more calcium available to react with the $SO_2$.

FIG. 1 shows a preferred embodiment of a wet flue gas desulfurization process, wherein slurry 14 is prepared by reducing the particle size of limestone 10 by crushing it in ball mill 12, with water, to a mesh suitable for pumping. Adding a quantity of PLA and/or PGA byproduct polyester stream to limestone and water while preparing the slurry reduces frictional losses in the ball mill, reduces power consumption and enhances the solubilization of the alkaline solids, most commonly limestone (calcium carbonate). The organic acid contaminants included in the byproduct polyester stream catalyze the reversion of linear aliphatic esters back into their hydroxy acid monomers, so as to begin the conversion of calcium carbonate to their calcium salts earlier in the process than if added in absorber 20.

Pump 16 supplies slurry 14 under pressure to spray bar 18 of slurry spray system 22 in absorber 20 for bringing untreated flue gas 24 into intimate contact with the slurry mixture and allowing the calcium salts of the absorber catalyst to react with the $SO_2$ of the flue gas for desulfurization thereof, so that the treated flue gas 26 can be released into the atmosphere through stack 28.

Air is blown into absorber 20 through air input 30 to provide oxygen for conversion of the sulfur dioxide ($SO_2$) into the sulfate ion ($SO_4$), which displaces the carbonate ion ($SO_3$) to form gypsum. The gypsum is pumped out through discharge 32 for disposal while the water and catalyst are recycled in the process.

While specific embodiments of the present invention have been disclosed, those skilled in the art will recognize that using the claimed byproduct polyester streams as catalysts in any WFGD process will enhance its efficiency and reduce costs. Moreover, sodium carbonate and magnesium carbonate are also viable reactants, used in place of calcium carbonate, for flue gas desulfurization to the present invention.

We claim:

1. A process for wet flue gas desulfurization comprising the steps of:
    preparing a slurry of alkaline solids selected from the group consisting of sodium carbonate, potassium carbonate, calcium carbonate and magnesium carbonate;
    activating the slurry of alkaline solids by mixing enantiopure, L or D, monomers and polymers of lactic acid, with or without monomers and polymers of glycolic acid or other hydroxy acids into the slurry to promote solubilization of the alkaline solids;
    bringing untreated flue gasses into intimate contact with the slurry mixture, where the monomers and polymers of hydroxy acids catalyze a reaction of flue gas sulfurs and solubilized alkalines to remove sulfur from the flue gas; and
    releasing the desulfurized flue gas into the atmosphere.

2. The process of claim 1, wherein the selected alkaline solids are calcium carbonate in the form of limestone.

3. The process of claim 1, wherein the enantiopure monomers and polymers of lactic acid are in the form of a byproduct polyester stream from the manufacture of polylactic acid (PLA).

4. The process of claim 1, wherein the monomers and polymers of hydroxy acids are in the form of a byproduct polyester stream from the manufacture of polyglycolic acid (PGA).

5. The process of claim 1, wherein poly hydroxy acids, such as gluconic acid and its homologues are also added to the slurry mixture.

6. The process of claim 1, wherein preparing the slurry includes the step of reducing particle size of the alkaline solids.

7. The process of claim 6, wherein the acid monomers and polymers are introduced while preparing the slurry.

8. The process of claim 6, wherein the step of reducing particle size of the alkaline solids is accomplished by milling and the acid monomers and polymers are introduced to reduce frictional losses.

9. A process for a wet flue gas desulfurization wherein the inherently enantiopure monomers and polymers of hydroxy acids in a byproduct polyester stream from the manufacture of PLA act as an agent for catalyzing the reaction of flue gas sulfurs and alkalines for removal of sulfur from the flue gas.

10. A process for a wet flue gas desulfurization wherein a byproduct polyester stream from the manufacture of PGA acts as an agent for catalyzing the reaction of flue gas sulfurs and alkalines for removal of sulfur from the flue gas.

11. A process for wet flue gas desulfurization comprising the steps of:
  preparing a slurry of alkaline solids selected from the group consisting of sodium carbonate, potassium carbonate, calcium carbonate and magnesium carbonate;
  activating the slurry of alkaline solids by mixing a byproduct stream taken from the manufacture of polyesters, the stream comprising enantiopure monomers and polymers of hydroxy acids, into the slurry to promote solubilization of the alkaline solids;
  bringing untreated flue gasses into intimate contact with the slurry mixture, where the monomers and polymers of hydroxy acids catalyze a reaction of the flue gas sulfurs and activated alkaline solids to remove sulfur from the flue gas; and
  releasing the desulfurized flue gas into the atmosphere.

12. The process of claim 11, wherein the polyester byproduct stream is derived from the manufacture of polylactic acid (PLA).

13. The process of claim 11, wherein the polyester byproduct stream is derived from the manufacture of polyglycolic acid (PGA) and added to the slurry.

14. The process of claim 11, wherein preparing the slurry includes the step of reducing particle size of the alkaline solids.

15. The process of claim 14, wherein the byproduct polyester stream is added while preparing the slurry.

16. The process of claim 11, wherein the slurry includes poly hydroxy organic acids.

* * * * *